US005547209A

United States Patent [19]

Vanderlinde

[11] Patent Number: 5,547,209
[45] Date of Patent: Aug. 20, 1996

[54] DEVICE FOR BOAT TRANSPORT

[76] Inventor: Robert L. Vanderlinde, 201 N. Prairie Ave., Sioux Falls, S. Dak. 57104

[21] Appl. No.: 398,150

[22] Filed: Mar. 3, 1995

[51] Int. Cl.$^6$ ...................................................... B60P 3/10
[52] U.S. Cl. ........................................ 280/414.2; 114/344
[58] Field of Search ............................. 280/414.1, 414.2, 280/47.32, 78; 114/343, 344

[56] References Cited

U.S. PATENT DOCUMENTS

| | | | |
|---|---|---|---|
| 2,009,548 | 7/1935 | Goin et al. | 280/78 |
| 2,489,705 | 11/1949 | Du Brie | 114/344 |
| 2,570,656 | 10/1951 | Dustin et al. | 114/344 |
| 2,617,139 | 11/1952 | Bittel | 114/344 X |
| 2,624,591 | 1/1953 | Choplin | 114/344 X |
| 3,095,585 | 7/1963 | Thomas | 114/344 |
| 3,337,243 | 8/1967 | Rued | 280/515 X |
| 5,098,113 | 3/1992 | Albitre | 280/78 X |

FOREIGN PATENT DOCUMENTS

| | | | |
|---|---|---|---|
| 127772 | 5/1948 | Australia | 280/414.2 |
| 141679 | 10/1949 | Australia | 114/344 |
| 1041226 | 9/1966 | United Kingdom | 114/344 |

*Primary Examiner*—Kevin T. Hurley

[57] ABSTRACT

A device for transporting a boat consisting, in combination with the boat, of an attachment device adapted to attach the boat to a pulling vehicle, and a second device attached to the boat at the end opposite the vehicle and including a wheel adapted to roll on the surface and support that end of the boat. The attachment device is designed to support the end of the boat nearest the towing vehicle.

4 Claims, 2 Drawing Sheets

DEVICE FOR BOAT TRANSPORT

BACKGROUND AND SUMMARY OF THE INVENTION

This invention pertains to devices to allow small hunting and fishing boats, jon boats, canoes and the like to be readily transported. The mechanism consists of clamping devices to be attached to the boat to transform it into a trailer to be pulled by a car, pickup truck, motorhome and similar vehicles.

Many boats are owned by people who do not live on a waterfront and, therefore many smaller boats are moved to and from the water on trailers. That type of transport may well be a necessity for boats above a certain size. However for small open fishing boats, jon boats, hunting boats and the like, a trailer is a substantial expense and inconvenience, requiring launching ramps and other amenities.

By the present invention, a couple of attachments used in combination with the boat make a trailer completely unnecessary. The attachments can be used both on the road for distant transport, and because the boats may be relatively light in weight, may also be convenient for moving the boat by hand to a launching site.

DESCRIPTION

Figure 1:
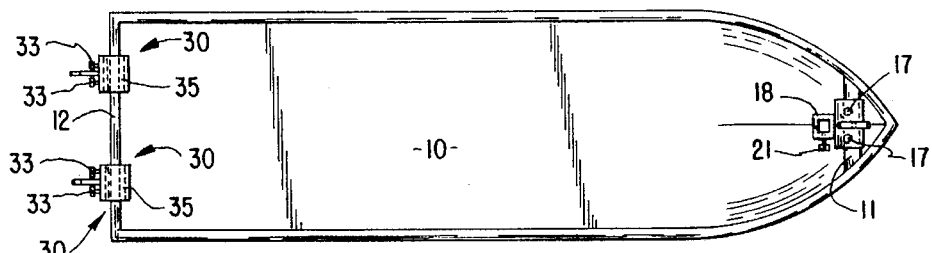
FIG. 1 is a top plan view of a boat with the attachments in place, when afloat.
Figure 2:
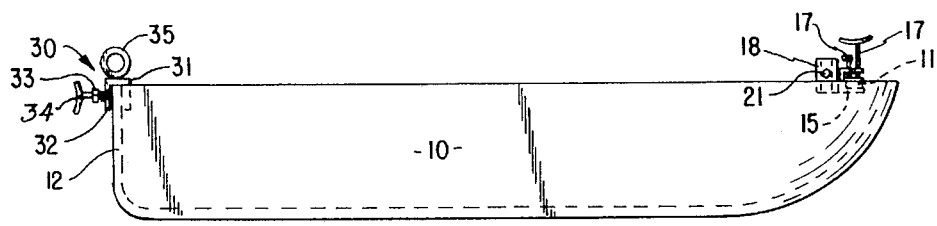
FIG. 2 is a side elevational view of the boat of FIG. 1.

Briefly, this invention is a combination of an attachable wheel and an attachable tongue with a boat to provide a method of transport for the boat both on the road and especially from the road to a launching site.

More specifically and referring to the drawings, the combination is illustrated in connection with an open boat used commonly as a boat for hunters of wild water fowl. The boat 10 has a bar 11 across the point of the bow, and has a flat back 12. Illustration of that type of boat is not meant to be exclusive because small alterations may be possible to allow a similar conformation of the invented attachments to be used with such other types of boat as a double-ended canoe.

On the type of boat shown, a wheeled bracket is removably clamped to the back 11. This part of the device includes a clamp composed of a C-shaped member 15 which embraces the bar 11 and a pressure plate 16 adapted to press against the bar 11 under the influence of screw-threaded members 17. A tubular socket member 18 is fixed to the C-shaped member 15 so that clamping the C-shaped member 15 to the bar 11 also fixes the socket member 18 to the boat.

A wheel bracket including a stem 20 is adapted to slide within the socket 18 and is clamped therein by a set-screw 21. A yoke 23 fixed to the stem 20 is a part of the wheel bracket, and holds a wheel 25 journalled on an axle 26. The wheel may be held onto the axle by a nut 28 with proper safeguards to prevent the nut from being unthreaded and falling off the axle. A fender 27 may be provided to guard against material from the road being thrown up by the wheel. It will be obvious to those skilled in the art that the wheel 25 could be held in a castoring yoke pivoted on the stem 20 if desired. Such an arrangement might be desirable if the boat were to be transported long distances on highways. It might be a disadvantage for instances where the boat is to be wheeled by hand from a road to a waterfront for launching.

At the stern end of the boat, two journal brackets 30 are clamped to the boat stern member 12. These brackets also include a C-shaped member 31 embracing the stern member 12, and clamped onto that member by a pressure plate 32 engaged by screws 33. T-shaped handle members 34 may also be used in part to place pressure on the plate 32. These members also provide convenient handles when the boat is to be moved by hand. Tubular journal members 35 are permanently fixed to the C-shaped member 31 and thus form a part of the journal bracket 30.

Figure 4:
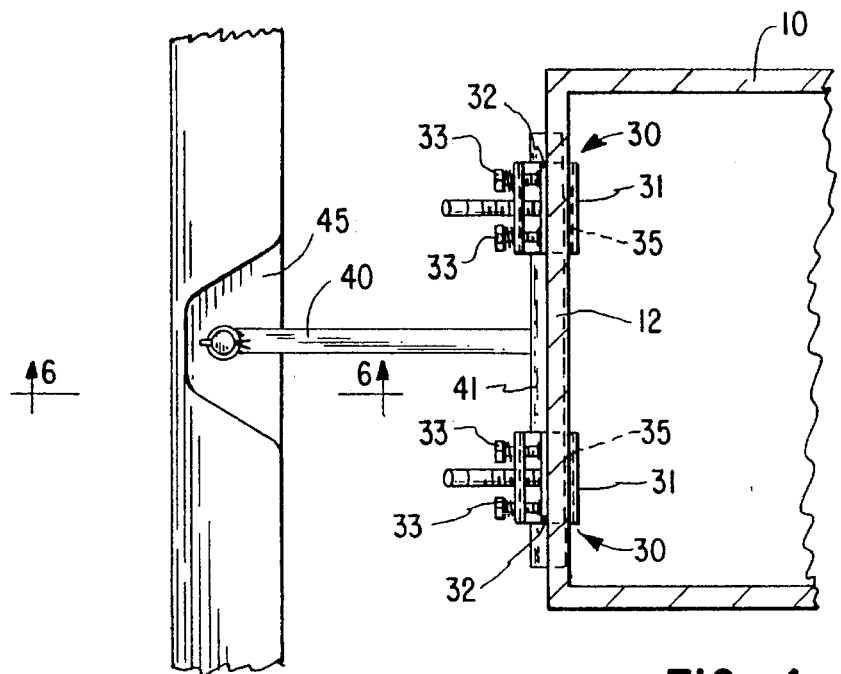
FIG. 4 is a view from line 4—4 of FIG. 3.
Figure 6:
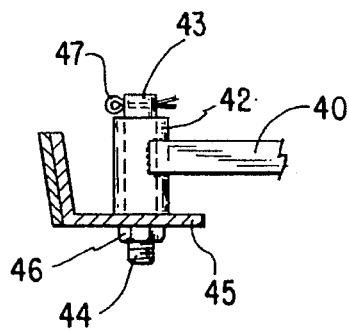
FIG. 6 is a detailed view from line 6—6 of FIG. 4.

A T-shaped tongue formed of a stem 40 and cross member 41 is adapted to be journalled in the tubular members 35 (FIG. 4). Removal by unclamping or by sliding one of the journal brackets 30 to one side makes this assembly easy. At the end of the stem 40, a vertical tube 42 is fixed in position to be pivotally journalled on an axle 43 which is fastened to a trailer hitch 45 mounted on a towing vehicle. The axle 43 may terminate in a threaded tang 44 held to the hitch 45 by a nut 46. The tube 42 can be slid over the axle 43 and be held in place against bouncing off by a cotter key or similar fastener 47.

Figure 3:
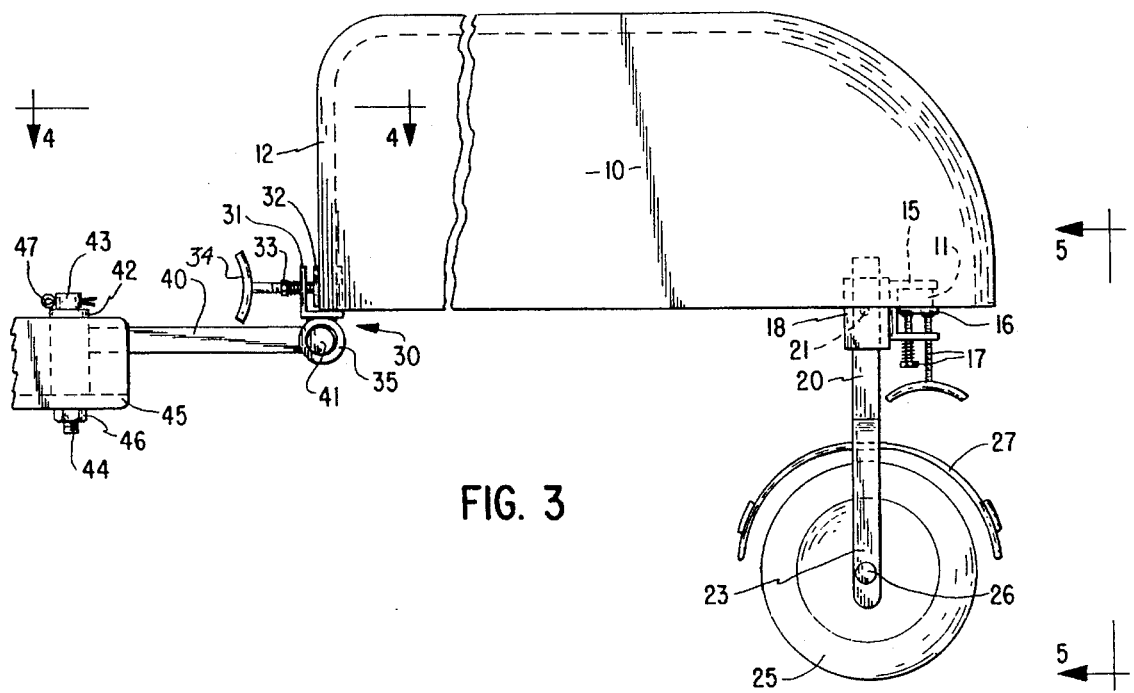
FIG. 3 is an elevational view to an enlarged side of the boat when being transported.
Figure 5:
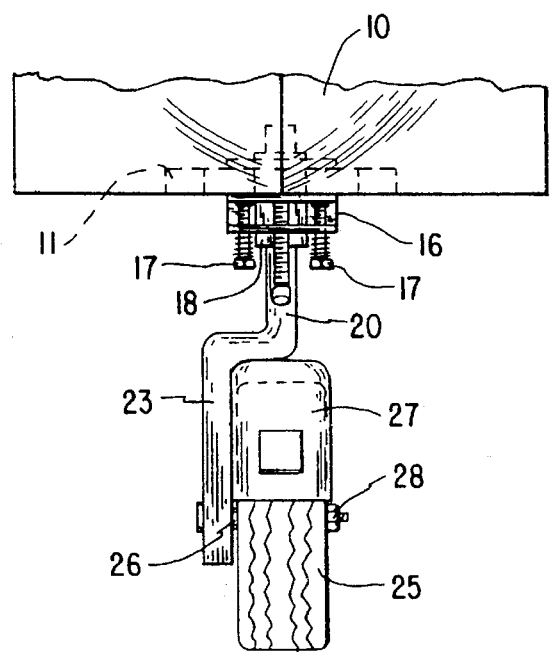
FIG. 5 is a view from line 5—5 of FIG. 3.

In use as a trailer, the T-shaped tongue is rigged as shown in FIGS. 3–5. The wheel bracket is assembled as there shown and the inverted boat becomes, in effect, a trailer. As such it is readily transportable on the road. When the destination is reached, the tongue is removed from the journal brackets 30 by releasing one bracket and sliding it off the cross member 41, then sliding the cross member 41 from the still clamped bracket 30, or by unclamping both brackets. The brackets may be re-clamped to the stern member 12 to provide handles for wheeling the boat in the manner of a wheel barrow to the launching site. When the waters edge is approached, the boat can be rolled to an upright position and launched into the water. The stem 20 and its wheel 25 may then be removed, if desired, and carried in the boat. It will be obvious that because of the ease of handling, the boat can be used in areas far removed from boat ramps and the like without the requirement of the boat being carried. It will also be obvious that with only modest variations, a canoe could also be similarly fitted.

I claim as my invention:

1. In combination with a boat having a bow end and a stern member, a wheel bracket adapted to be fastened to said bow end, a wheel journalled in said wheel bracket and means removably attached to said stern member to fasten said stern member to a towing vehicle including brackets attached to said stern member, connecting means including at least one cross member journalled in said brackets on an axis substantially parallel to said stern member, said connecting means being attachable to said towing vehicle.

2. The combination of claim 1 in which said connecting means includes a substantially vertical member adapted to be pivotally connected to said towing vehicle on a substantially vertical axis.

3. The combination of claim 1 in which said brackets include handle means for manually grasping said bracket.

4. In combination with a boat having a bow end and a stern member, a wheel bracket adapted to be fastened to said bow end, a wheel journalled in said wheel bracket, means removably attached to said stern member to fasten said stern member to a towing vehicle having a trailer hitch, said means to fasten said stern member including brackets attached to said stern member, connecting means including at least one cross member journalled in said brackets on an axis substantially parallel to said stern member, said connecting means being attachable to said towing vehicle, said connecting means including a substantially vertical member adapted to be pivotally connected to said towing vehicle on a substantially vertical axis, an axle device fastened to said trailer hitch, to form said vertical axis, said vertical member being journalled on said axle device.

* * * * *